Aug. 27, 1957 M. A. TOWNSEND 2,804,565
GASEOUS DISCHARGE DEVICES
Filed June 20, 1950 7 Sheets-Sheet 1

INVENTOR
M. A. TOWNSEND
BY
ATTORNEY

INVENTOR
M. A. TOWNSEND
BY
ATTORNEY

INVENTOR
M. A. TOWNSEND

INVENTOR
M. A. TOWNSEND
BY
ATTORNEY

Aug. 27, 1957 M. A. TOWNSEND 2,804,565
GASEOUS DISCHARGE DEVICES
Filed June 20, 1950 7 Sheets-Sheet 7

INVENTOR
M. A. TOWNSEND
BY
ATTORNEY

United States Patent Office 2,804,565
Patented Aug. 27, 1957

2,804,565

GASEOUS DISCHARGE DEVICES

Mark A. Townsend, Berkeley Heights, N. J., assignor to Bell Telephone Laboratories, Incorporated, New York, N. Y., a corporation of New York Application June 20, 1950, Serial No. 169,121

18 Claims. (Cl. 313—185)

This invention relates to gaseous discharge devices and more particularly to such devices of the cold cathode glow discharge type.

Devices of the type to which this invention pertains comprise, in general, an enclosing vessel having an ionizable medium, such as a gas or a mixture of gases, therein, and an anode and a cathode within the vessel. Some devices of known construction exhibit a negative resistance under certain operating conditions. Specifically, the slope of the static voltage-current characteristic is negative in a region between the breakdown and sustaining voltages for the device. However, in the known devices, in the operating range wherein the negative resistance obtains, the current is quite small, of the order of microamperes. Furthermore, such characteristic is unstable and not reproducible from device to device. Moreover, the slope of the characteristic varies markedly with current so that maintenance of a satisfactory operating point is extremely difficult, if not impossible. In addition, the slope is variable with frequency and may become positive, for example at frequencies of a few hundred cycles and higher.

One general object of this invention is to realize improved performance characteristics for gaseous discharge devices and to enhance the operating capabilities thereof.

More specifically, objects of this invention are to obtain stable and reproducible impedance characteristics for gaseous discharge devices, negative resistance at large operating currents and over wide ranges of currents and frequencies, substantially constant resistance and inductance over a wide range of frequencies, and a substantially constant negative slope of the voltage-current characteristic over a range of frequencies. Other objects of the invention are to enable two-way signal transmission and amplification in a single glow discharge device and to facilitate controlled variation of the impedance of such devices.

In one illustrative embodiment of this invention, a glow discharge device comprises a cold cathode and an anode mounted in juxtaposition in an envelope having an ionizable atmosphere therein. Advantageously, the cathode is of a refractory metal, such as molybdenum, tantalum or columbium, although oxide coated type cathodes, such as those including a coating of barium oxide on a nickel base, may be used. The ionizable atmosphere may be a rare gas such as neon or argon, or a mixture of gases, for example of helium and neon.

In accordance with one broad feature of this invention, the cathode geometry, cathode to anode spacing and gas pressure are uniquely correlated so that prescribed and reproducible impedance characteristics of preassigned magnitude and sign are realized.

In accordance with a more specific feature of this invention, the parameters aforementioned are correlated so that at a cathode to anode voltage above the minimum sustaining voltage, in the abnormal voltage range, the resistive component of the impedance of the device is negative. This negative resistance obtains over a range of high operating currents and a wide range of frequencies of signals applied to the device.

Devices constructed in accordance with this invention are suitable for unilateral or bilateral transmission of signals, for example in telephone transmission or switching circuits. By virtue of the negative resistance characteristic amplification of signals is realizable. Further, devices constructed in accordance with this invention may be used to advantage in oscillators, modulators, switching systems, filters, transmission line loading elements, variable impedance units and other applications.

The invention and the above noted and other features thereof will be understood more clearly and fully from the following detailed description with reference to the accompanying drawing in which.

Figure 1:
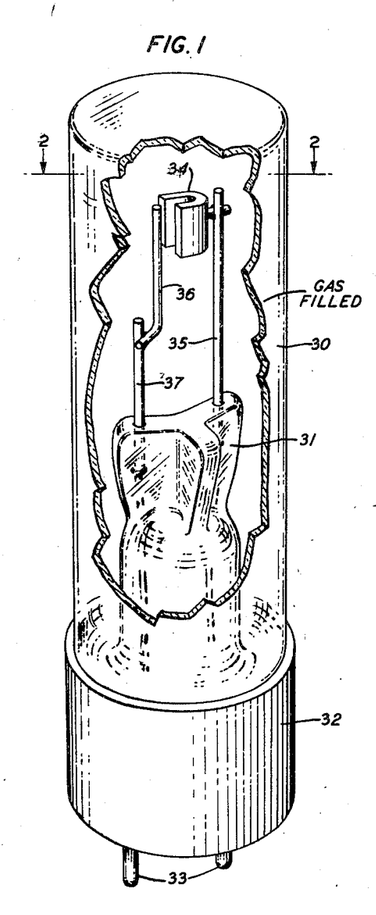
Fig. 1 is a perspective view of a glow discharge device illustrative of one embodiment of this invention.
Figure 2:
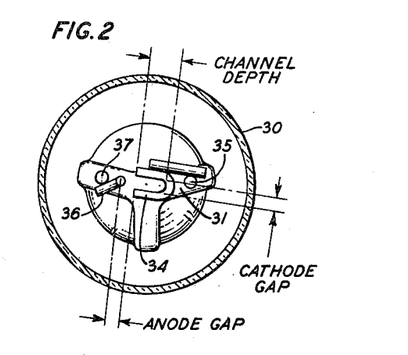
Fig. 2 is a plan view showing the configuration and relation of the electrodes in the device illustrated in Fig. 1.

Referring now to the drawings, the glow discharge device illustrated in Figs. 1 and 2 comprises an enclosing vessel 30 having a gaseous filling therein, the vessel having also a stem 31 and being affixed to a base 32 carrying terminal prongs 33. Mounted within the vessel 30 is a generally U-shaped cathode of refractory material such as molybdenum. The cathode may be formed of sheet material, for example of a .020-inch thick molybdenum, and is mounted by a rigid wire 35 connected to one of the terminal prongs 33. Opposite the open side of the channel in the cathode 34 is a linear anode 36 advantageously of a refractory metal formed, for example, of .012-inch diameter molybdenum. The anode extends parallel to the channel in the cathode 36 and is supported by a rigid wire 37 connected to the other of the terminal prongs 33.

Figure 3:
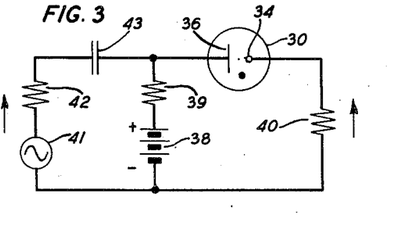
Fig. 3 is a circuit diagram of an amplifier including a discharge device constructed in accordance with this invention.

An illustrative circuit in which the device of Fig. 1 may be utilized is shown in Fig. 3. As there shown, a suitable direct-current source such as a battery 38 is connected between the anode and cathode in series with a load 40 illustrated as a resistor. A second resistor 39 may be connected between the source and the anode 36 as shown. A variable or alternating input signal from a source 41 is applied to the device in superimposed relation upon the direct-current bias due to the source 38, through a resistance 42 and capacitor 43.

The impedance of a device of the construction hereinabove described, determined by superimposing a small alternating-current signal, for example, of the order of 5 to 10 percent of the direct operating current upon the direct operating current, is an inductive reactance in series with a resistance. In general, the impedance, and more specifically both components thereof, are functions of the direct operating current and the frequency. Moreover, it has been found that by proper correlation of significant parameters a negative resistance may be obtained in a particularly useful operating range of the device. Principal among these significant parameters are the cathode gap, i. e., the distance between the juxtaposed effective surfaces of the cathode bounding the channel therein, the anode gap, i. e., the spacing of the anode from the edges of the cathode nearest thereto, the gas and the gas pressure. The relationship of these parameters requisite to obtain the negative resistance do not lend themselves readily to mathematical analyses. However, as will be developed hereinafter in some detail, ranges of unique relationships involving cathode geometry, cathode to anode spacing, and gas pressure definitely exist whereby prescribed and particularly useful impedance characteristics for the device can be realized.

Figure 4:
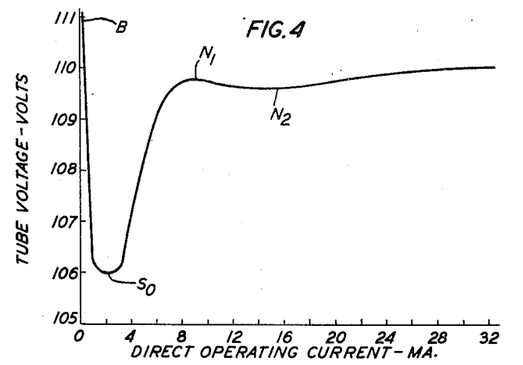
Figs. 4, 5 and 6 are graphs portraying operating characteristics of a glow discharge device of the construction illustrated in Figs. 1 and 2.
Figure 5:
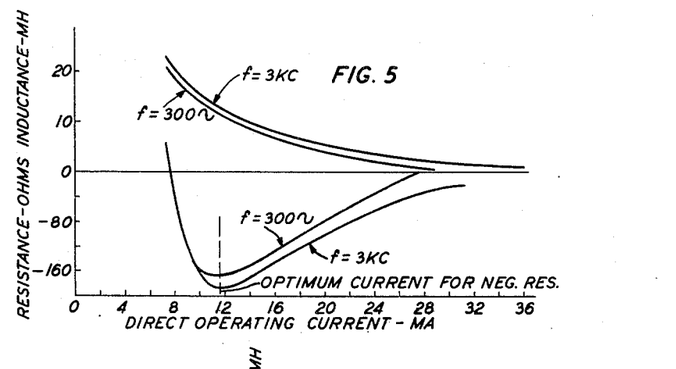
Figure 6:
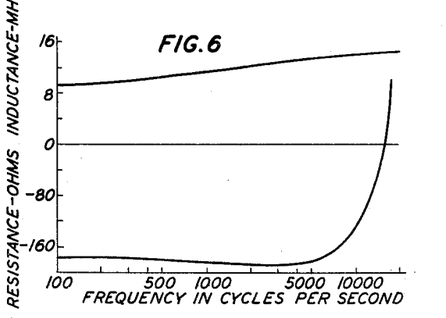

General relationships are illustrated in Figs. 4, 5 and 6, the graphs in these figures showing the characteristics of a device of a construction shown in Fig. 1 wherein the cathode gap was 0.023-inch, the anode gap was 0.015-inch, the channel depth 0.065-inch and the gas filling in the vessel 30 was neon at a pressure of 58 millimeters of mercury.

The graph of Fig. 4 depicts the voltage across the electrodes of the device as a function of the direct operating current. As therein shown, in a range from the breakdown voltage somewhere above the point B to the minimum sustaining voltage indicated at the point $S_0$, the resistance of the device is negative. However, in this range the current is very small, the resistance is unstable, varies from tube to tube and is difficult to predetermine precisely. In the range above the minimum sustaining voltage $S_0$, this range being commonly designated the abnormal voltage range, it will be noted that the characteristic rises up to a point $N_1$, and in the range between $S_0$ and $N_1$ the resistance is positive. However, immediately beyond the point $N_1$, the slope of the characteristic is negative and a negative resistance, therefore, obtains for operating points between $N_1$ and $N_2$ corresponding roughly to operating currents of about 8½ milliamperes and 16 milliamperes. Beyond the point $N_2$, the characteristic again rises, i. e., has a positive slope whereby the resistance is positive.

For alternating-current conditions, i. e., for an alternating-current signal superimposed upon the direct operating current, the components of the impedance of the device vary with frequency and direct operating current as illustrated in Figs. 5 and 6. Specifically, as shown in Fig. 5, the inductance is positive and in general decreases as the direct operating current increases. The inductance for two frequencies of applied alternating-current signal, specifically frequencies of 300 cycles and 3 kilocycles, are represented by the upper curves in Fig. 5, and as will be apparent, the difference in inductance for these two frequencies is relatively small. Similarly, the two lower curves in Fig. 5 show the resistive component of the impedance for these two frequencies. As is evident, for direct operating currents of about 8 milliamperes and higher, the resistance is negative and is a maximum for a direct operating current of 11.6 milliamperes. This point of maximum resistance is herein referred to as the optimum current.

The curve of Fig. 4 was obtained by allowing the voltage to reach an equilibrium value at each current. At the higher currents there is appreciable heating of the cathode with a resulting decrease in gas density near the cathode. When no time is allowed for this heating, i. e., readings are made with the current increased for times less than about one-half second, the upper limit $N_2$ of Fig. 4 occurs at currents comparable to the limit shown in Fig. 5.

For a device of the specific construction above described and wherein the operating current is maintained at the optimum of 11.6 milliamperes, the relationship between resistance and inductance on the one hand and frequency on the other is as illustrated in Fig. 6. As there shown, the inductance increases gradually over the range of frequencies between 100 and beyond 10,000 cycles. The resistance is negative and substantially constant over the range from 100 to 5,000 cycles. It is to be emphasized that not only are the resistance and inductance uniform over a wide frequency range as is evident from Fig. 6, but also that these impedances are stable and reproducible with precision from device to device.

As has been indicated hereinabove, the negative resistance is dependent upon a number of parameters. The relationships are portrayed in Figs. 7 to 11, inclusive. Specifically, these figures illustrate the relationships for a device of the construction illustrated in Fig. 1, but wherein one significant parameter was varied in the manner hereinafter set forth.

Figure 7:
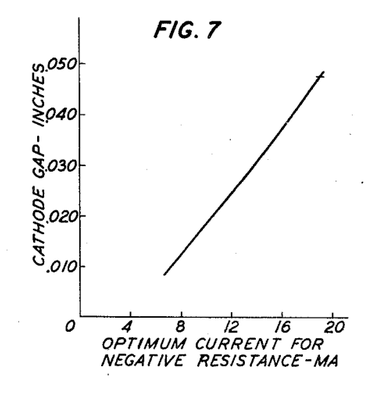
Figs. 7 to 11 are graphs depicting certain relationships between parameters of the device illustrated in Fig. 1 and operating characteristics of the device.

Considering first Fig. 7, there is shown therein the relationship between the optimum current and the cathode gap, all other parameters of the device being as set forth hereinabove. As therein shown, the optimum current increases substantially linearly with increasing cathode gap. Although the optimum current varies with cathode gap in the manner depicted in Fig. 7, it has been found that it varies but little with the gas pressure and the operating frequency. For example, as to frequency, as is illustrated in Fig. 5, the optimum current is substantially the same for frequencies of 300 cycles and 3 kilocycles.

Figure 8:
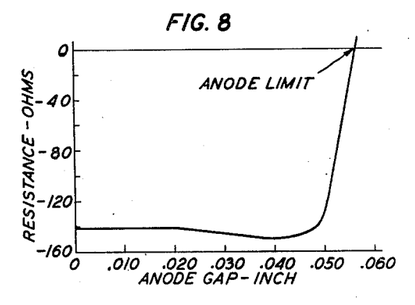
Figure 9:
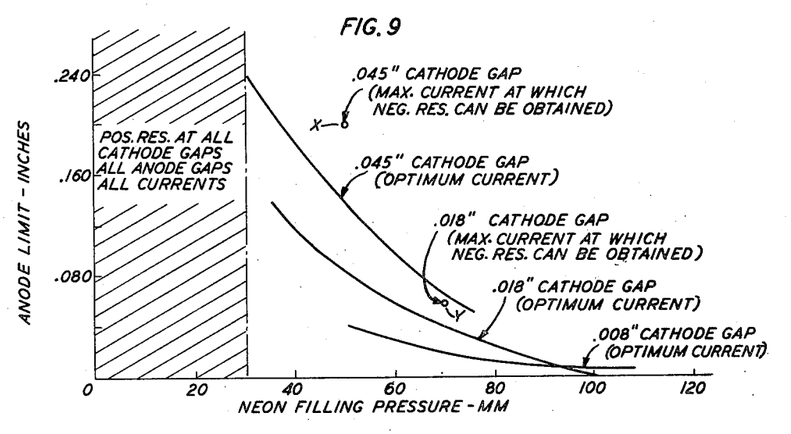

The general relationship between the negative resistance and anode gap, all of the other parameters being maintained constant is depicted in Fig. 8. The resistance is negative and substantially constant over a wide range of anode gap values up to a critical value appearing at about 0.048-inch. Beyond this the negative resistance rapidly decreases and ultimately becomes positive. The value of anode gap for which the negative resistance disappears has been termed the anode limit. The anode limit is dependent upon the cathode gap and the gas pressure. The specific relationships will be understood from a consideration of Fig. 9 wherein the graphs depict the anode limit in relation to the gas filling pressure for several different cathode gaps. For the several curves of Fig. 9, the device was operated at the optimum direct operating current. As is clear from the figure, the anode limit increases with an increase in the cathode gap and decreases with an increase in the gas pressure. As indicated by the points X and Y, the anode limit is affected by the operating current, these two points representing conditions for operating current above the optimum.

For anode gaps less than that corresponding to the anode limit, the tube inductance is essentially independent of anode gap.

Figure 10:
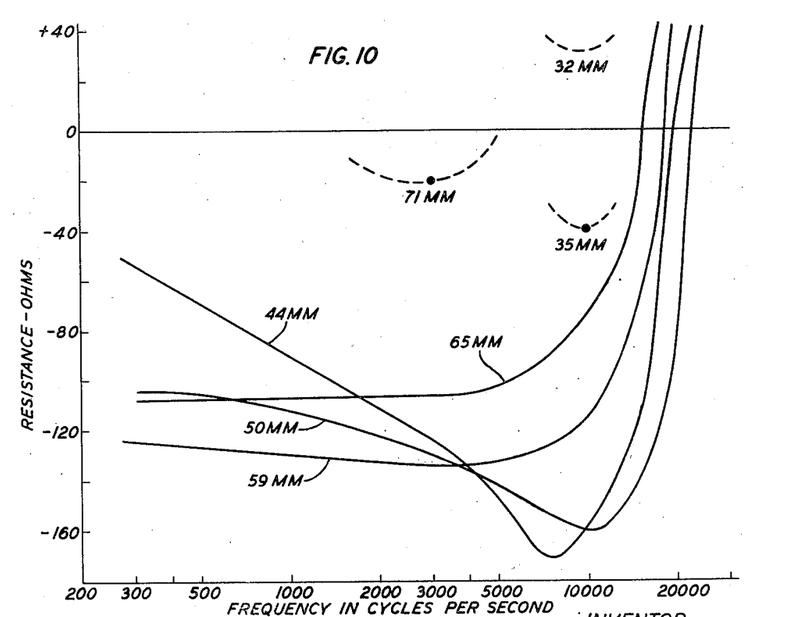

The gas pressure is a significant parameter also in affecting the relationship between the resistance and frequency as is illustrated in Fig. 10. In this figure, resistance is plotted against frequency, each of the several curves being for a device of different gas pressure as indicated on the curve. The effective gas pressure is isolated by setting the anode gap below the anode limit as determined from Fig. 8 and by setting the operating current at the optimum value as given by Fig. 7. Thus with the anode gap and operating current fixed, the impedance may be measured as a function of frequency for a range of gas pressures. The curves of Fig. 10 portray characteristics for a cathode gap of 0.024-inch. As therein shown, for pressures below about 32 millimeters and above about 71 millimeters no negative resistance is obtainable for this value of cathode gap. For other gas pressures, the gas being neon in each case, the resistance varies with frequency as depicted. Particularly to be noted is the substantial constancy of the resistance with frequency for gas pressures of the order of 59 to 69 millimeters.

It has been found that the upper limit of gas pressure for which a negative resistance may be realized is increased when the cathode gap is reduced. For exceedingly small cathode gaps, say of the order of 0.005-inch, the upper limit for pressure of the neon filling is about 150 millimeters of mercury.

From Fig. 10 it can be concluded that for the particular electrode geometry illustrated in Fig. 1 a negative resistance can be realized if the gas pressure lies between about 30 millimeters and 120 millimeters, irrespective of the cathode gap, frequency, anode gap or operating current.

The inductance remains essentially independent of pressure and frequency over the range shown in Fig. 10, except that at pressures below about 50 millimeters of mercury there is some reduction in inductance, particularly at the lower values of frequency. The inductance lies between 7 and 14 millihenries over the entire range of frequencies and pressures shown in Fig. 10.

Figure 11:
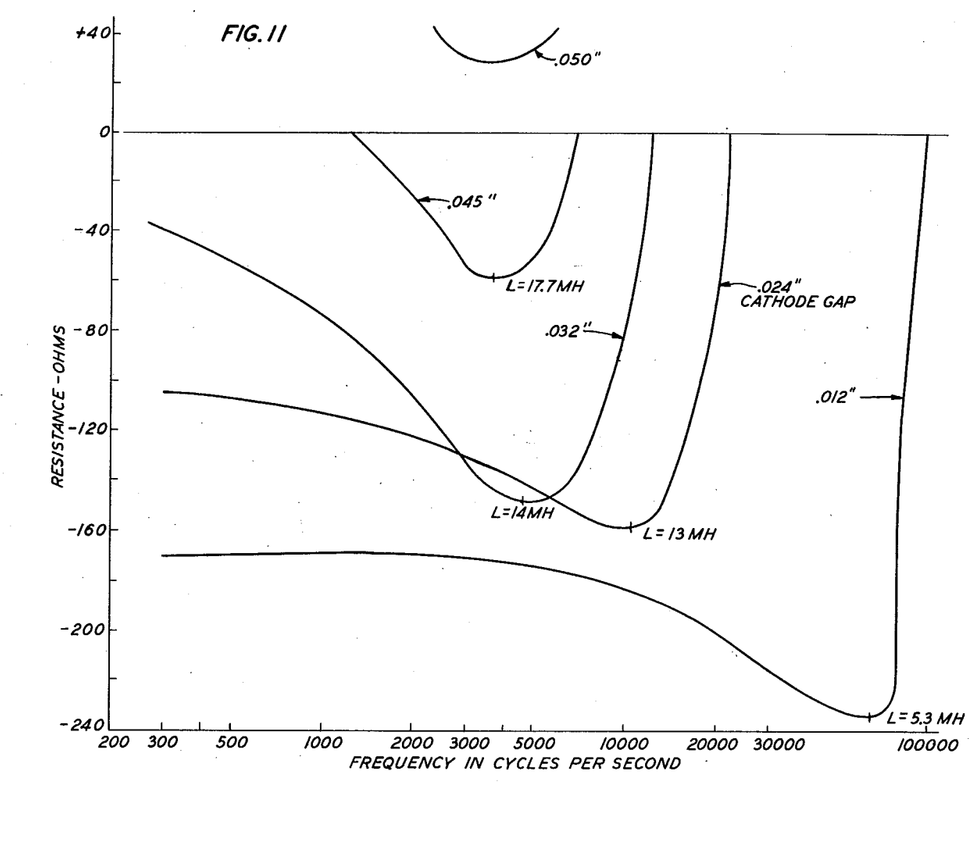

Another significant relationship, namely, between resistance and frequency for various values of cathode gap is represented in Fig. 11. Values for inductance are indicated also on the curves. For the curves of this figure, the gas was neon at a pressure of 50 millimeters of mercury and the effects of anode gap and operating current were isolated as described hereinabove in the discussion of Fig. 10. It is to be noted that as shown in Fig. 11 negative resistance is not obtainable for the particular electrode geometry involved for cathode gaps much above 0.045-inch. The lower limit on the cathode gap appears to be determined solely by mechanical considerations. For extremely small cathode gaps, a very small anode gap is required which is difficult to maintain. Further, such small anode gap involves tendency of shorting as a result of sputtered cathode material accumulating on the anode.

Certain other factors bearing upon the impedance, and particularly the resistance, of the device may be noted briefly. The anode size is of but little moment. For example, in a device of the construction illustrated in Fig. 1, anode diameters from 0.004-inch to 0.060-inch have been used and the impedances found to be essentially the same as those for the specific case described hereinabove, although for the larger anodes the anode limit is somewhat higher. Similar characteristics have been realized with large plane anodes.

The cathode channel in the device of Fig. 1 involves the dimension of length, vertical in Fig. 1, as well as depth and cathode gap as designated in Fig. 2. In the specific devices discussed hereinabove, the channel length was 0.125-inch. In general, in order to obtain stable negative resistances, it is advantageous that both the channel depth and length be substantially greater than the cathode gap and such in relation thereto that the glow covers the entire bounding surface of the channel. If the depth or length are increased substantially without altering some other parameter, although negative resistances may obtain, there is a tendency for changes in the operating characteristics resulting from shifting of the glow in the channel. It has been found that the impedance characteristics for a cathode having one set of dimensions, i. e., length, depth and gap may be reproduced for other cathodes by multiplying all the dimensions by a constant factor and dividing the gas pressure by the same factor.

As has been indicated hereinabove, the cathode may be of any one of a number of materials. In the devices having the characteristics presented in Figs. 4 to 11, the cathodes were of sheet molybdenum. Essentially the same characteristics are obtainable with cathodes of sheet tantalum, of columbium and of nickel coated with barium oxide.

Mixtures of neon and helium may be used in place of pure neon. For example, devices wherein a number of such mixtures including up to 10 percent helium were utilized had characteristics substantially the same as those described hereinabove.

The negative resistance characteristic may be realized also with a variety of cathode geometries other than that disclosed in Fig. 1. Several of such other cathode constructions are illustrated in Figs. 12 to 19 inclusive.

Figure 12:
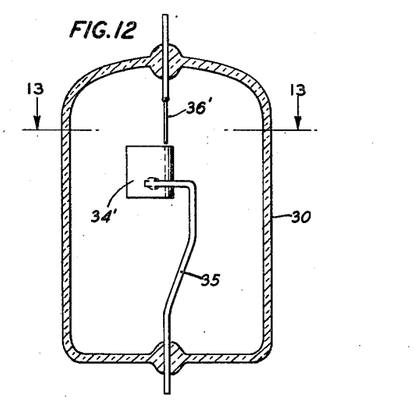
Figs. 12 and 13 are elevation and plan views respectively of a glow discharge device illustrative of another embodiment of this invention.
Figure 13:
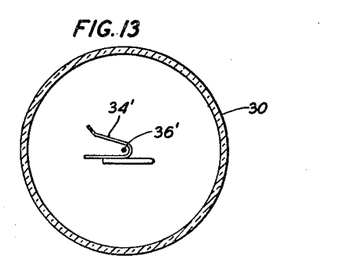

In the device illustrated in Figs. 12 and 13, the glow cathode $31^1$ is generally V-shaped and the anode $36^1$ is a rod terminating in juxtaposition to one of the ends of the cathode. In a typical construction, the anode was a 0.010 diameter nickel rod and the cathode was 0.008 sheet tantalum. The channel in the cathode was one-fourth inch deep and one-fourth inch long. The gap at the mouth of the straight-sided portion of the channel was approximately .030-inch and the radius at the base of the channel was approximately .010-inch. The anode gap was approximately 0.010-inch and the gaseous filling in the vessel 30 was argon at a pressure of 20 millimeters of mercury. For this typical device, negative resistances of the order of 1500 ohms at a frequency of 4,000 per second were obtained at an operating current of 6 milliamperes.

Figure 14:
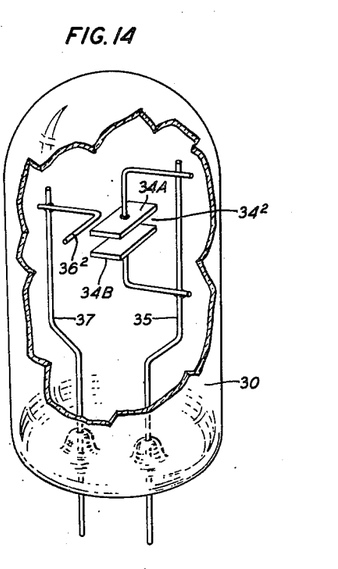
Fig. 14 is a perspective view of a glow discharge device illustrative of still another embodiment of the invention.

In the device illustrated in Fig. 14, the cathode, designated generally as $34^2$, comprises two parallel plates rigidly mounted on the cathode support 35, and the anode $36^2$ is supported by the leading-in conductor 37 parallel to and equally spaced from one side of the cathode plates 34A and 34B. In general it has been found that the cathode gap, i. e., the distance between the parallel plates 34A and 34B, should be less than the width or length of the plates. In one illustrative construction found satisfactory, the cathode plates may be 0.25-inch long and wide, the cathode gap, i. e., the spacing between the plates may be 0.015-inch and 0.035-inch, the gas neon at a pressure between 35 and 75 millimeters of mercury and the anode gap 0.040-inch.

Figure 15:
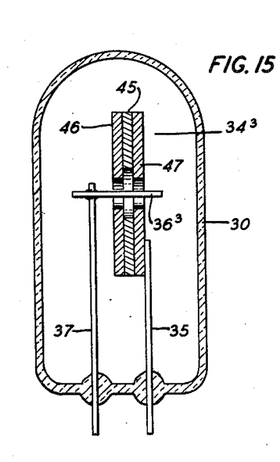
Fig. 15 is an elevation view of another device constructed in accordance with this invention.

In the device illustrated in Fig. 15, the cathode, designated generally as $34^3$, comprises plates or discs 45, 46 and 47 having coaxial apertures therein along the axis of which the anode $36^3$ extends. In a typical construction, the gas may be neon at a pressure of 35 to 75 millimeters of mercury, the diameter of the aperture in the plates 46 and 47 may be 0.154-inch, the width of the plate 45 may be 0.02-inch and the diameter of the aperture in the plate 45 greater than that of the apertures of the plates 46 and 47 by an amount equal to or greater than the width of the plate 45. For example, in a specific structure the diameter in the aperture 45 was 0.28-inch, the anode diameter may be 0.012-inch.

Figures 16, 17, 19:
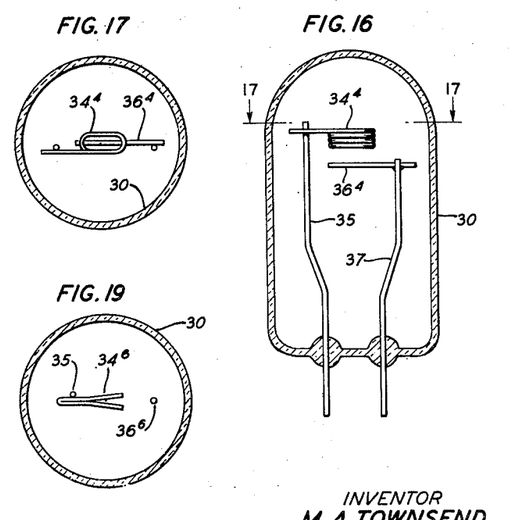
Figs. 16 and 17 are elevation and plan views respectively of a further illustrative embodiment of this invention.
Figs. 18 and 19 are elevation and plan views respectively of a still further illustrative embodiment of this invention.

In another construction illustrated in Figs. 16 and 17 suitable for the realization of negative resistance at high operating currents, the cathode $34^4$ is in the form of a flattened cylinder and the anode $36^4$ is a rod opposite one end of the cathode. The cathode may be formed of four turns of 0.020-inch diameter wire and the transverse dimensions thereof may be 0.02-inch and 0.04-inch. The gas may be neon and the anode gap and gas pressures within the ranges set forth hereinabove for devices of the construction shown in Figs. 1 and 2.

Figure 18:
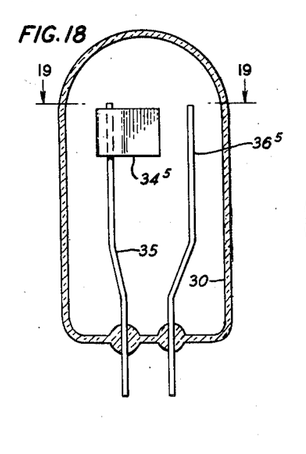

In another embodiment of this invention illustrated in Figs. 18 and 19, the cathode $34^5$ may be V-shaped with the channel therein $3/32$-inch deep and the mouth opening 0.025-inch. The gas may be neon and the gas pressures within the range noted hereinabove in connection with the discussion of the device illustrated in Figs. 1 and 2. The anode gap may be of the order of 0.025-inch.

It will be understood that in the devices illustrated in Figs. 12 to 19 the cathode may be of any of the materials mentioned hereinabove and that mixtures of gases, such as noted in the description of the device shown in Figs. 1 and 2 may be employed.

It will be appreciated from the foregoing, that the invention may be embodied in a variety of constructions by correlation of the significant parameters in the manner taught herein. Not only may negative resistance be obtained, but such resistance of magnitude within a wide range can be realized for any particular device, as is evident, for example, from Figs. 5, 10 and 11, as by operating at a prescribed point or region. In general, it has been found particularly advantageous that the operating voltage be equal to or higher than the normal glow voltage for the cathode material and gas, but, specifically, not substantially higher than the normal glow voltage plus the ionizing potential for the gas. For example, in the case of a device having a molybdenum cathode and a neon filling, the normal glow voltage is about 105 to 110 volts and the ionization potential of neon is about 21 volts, so that the particularly advantageous operating range of voltages is between about 106 and 130 volts.

Devices constructed in accordance with this invention are particularly useful as amplifiers, one illustrative circuit for this application being shown in Fig. 3. Although the negative resistance as determined on a direct-current basis, as depicted in Fig. 4, extends over a somewhat limited current range, for example from about 8.5 to about 15 milliamperes, the alternating-current impedance has a negative resistive component over a substantially greater range of currents. For example, in a typical device of the construction illustrated in Fig. 1 and having a direct-current characteristic as shown in Fig. 4, the resistive component of the alternating-current impedance is negative for current variations of ±10 milliamperes about a direct-current operating point of 18 milliamperes. For a smaller variation in current, say a variation of ±2 milliamperes about 11.6 milliamperes, the variation in this resistance is ±3 percent over this range. As has been pointed out hereinabove, particularly in the discussion of Figs. 5 and 6, both the resistive and inductive components of the impedance are substantially constant over a wide band of frequencies.

Two of the factors of prime moment in an amplifier are the gain and band width. It has been determined that for devices constructed in accordance with this invention utilized in a circuit of the configuration illustrated in Fig. 3, the insertion voltage gain, G realizable through the use of the device may be expressed as $$G = \frac{R_L + R_S}{R_L + R_S + R_T + j2\pi fL} \quad (1)$$

if the capacitor 43 is sufficiently large so that at the operating frequencies its reactance may be neglected, and $$G = \frac{R_S + R_L}{R_S + R_L + R_T + j\left(2\pi fL - \frac{1}{2\pi fC}\right)} \quad (2)$$

if the capacitor 43 is such as to neutralize the inductance L at some frequency, $f_o$, in the operating range. The insertion voltage gain may be defined as the ratio of the voltage across the load with the tube present to the voltage across the load when the tube is replaced by a short circuit. In Equations 1 and 2

$G$ = insertion voltage gain
$R_L$ = resistance of the load 40
$R_S$ = resistance of the source resistor 42
$R_T$ = resistance of the glow discharge device
$L$ = inductance of the glow discharge device
$C$ = capacitance of condenser 43, and
$f$ = frequency The band width B, i. e., the range between the frequencies at which the gain is 3 decibels below that at the frequency $f_o$, is given by the relation:

$$B = \frac{R_S + R_L + R_T}{2\pi L} \quad (3)$$

Compensation for the tube inductance does not materially alter the band width but does allow shifting of the range to a desired portion of the frequency spectrum, subject, of course, to the negative resistance-frequency characteristic of the glow discharge device.

Figure 25:
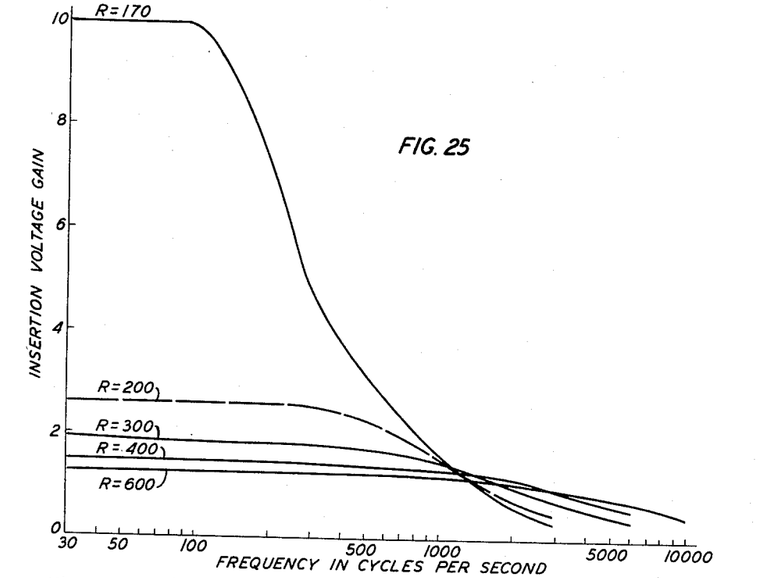
Figs. 25 and 26 are graphs illustrating typical performance characteristics of an amplifier embodying this invention.
Figure 26:
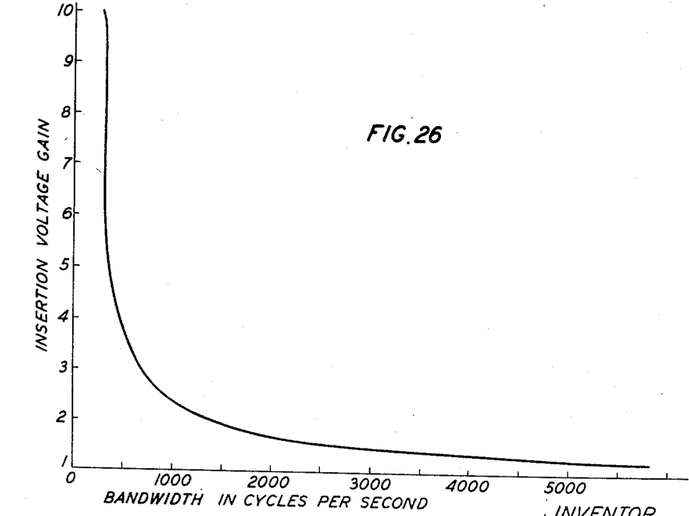

Typical gain and band width characteristics for a device of the construction illustrated in Fig. 1 are shown in Figs. 25 and 26, respectively. In the former, the third parameter R, indicated on the curves, is equal to the sum of $R_S$ and $R_L$, and the gains are those for any proportionate division of $R_S$ and $R_L$. Particularly to be noted in Fig. 25 are the wide range of gain which may be realized and the wide frequency range of uniform gain obtainable, both by operation upon the parameter R.

In Fig. 26, the coordinates are maximum band width and maximum insertion gain.

Figure 20:
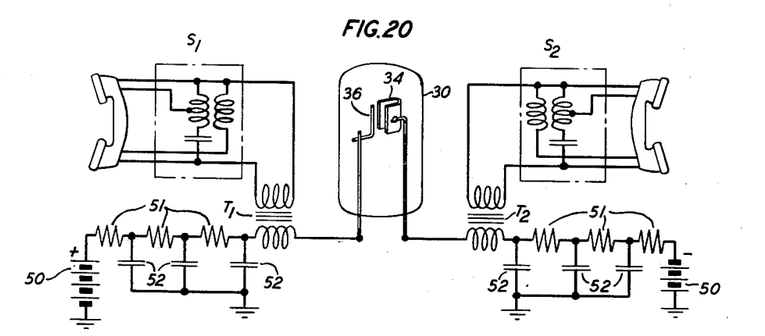
Fig. 20 is a circuit diagram illustrating one manner in which devices constructed in accordance with this invention may be utilized in a two-way communication transmission system.

Glow discharge devices constructed in accordance with this invention may be utilized to particular advantage as two-way amplifiers, as in telephone systems. For example, as illustrated in Fig. 20 the glow discharge device 30 is connected serially between two subscriber stations $S_1$ and $S_2$ by way of transformers $T_1$ and $T_2$. The requisite direct-current potential between the cathode 34 and anode 36 of the device is obtained from direct-current sources such as batteries 50 connected to the electrodes through ballast resistors 51. Capacitors 52 serve to bypass the resistors 51 so that the speech signal currents do not flow through these resistors. The transformers $T_1$ and $T_2$ isolate the direct current operating current of the device 30 from the subscriber stations and, further, may be utilized to adjust the impedance level for optimum amplification.

It will be noted that in the organization shown in Fig. 20, and above described, speech signals emanating at either station $S_1$ and $S_2$ and transmitted to the other will be amplified in the device 30.

Figure 21:
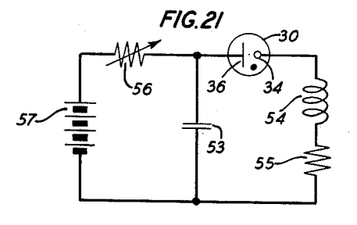
Figs. 21 and 22 are circuit schematics illustrating oscillators including glow discharge devices constructed in accordance with this invention.
Figure 22:
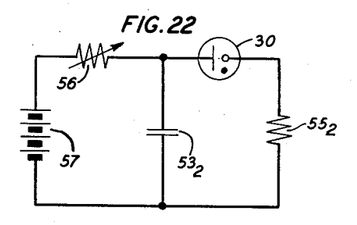

Devices constructed in accordance with this invention may be utilized also in oscillation generators the basic configuration of two of which are illustrated in Figs. 21 and 22. In the former figure, the direct-current operating current is provided from the source 57 connected to the anode 36 of the device 30 through an adjustable resistor 56. Connected across the electrodes of the device 30 is an inductance 54 very large in comparison to the inductance of the device, a capacitor 53 and a resistor 55. The resonant frequency of the oscillator is determined by the inductance 54 and capacitance 53, and may be adjusted by varying either of these impedances. Inasmuch as the inductance of the device 30 constitutes but a small portion of the total circuit inductance, changes in the direct operating current of the device 30 do not alter the frequency of oscillation substantially.

In a typical oscillation generator of the configuration shown in Fig. 21 and including a device of the construction illustrated in Fig. 1, and described hereinabove, the frequency of the oscillations generated was 7,100 cycles per second for the following parameters for the elements: source 57, 225 volts, resistor 56, 18,000 ohms, capacitor 53, .016-microfarad, inductance 54, 28 millihenries, resistor 55, 90 ohms.

In the oscillation generator illustrated in Fig. 22, the capacitor 53₂ is resonated with the inductance of the glow discharge device 30. The frequency of oscillation is thus a function of the current through the device 30 and may be varied accordingly by changing the resistance 56. Thus this oscillation generator is of the frequency modulated type. For example, in a specific circuit including a device of the construction illustrated in Fig. 1, the oscillating frequency was 1,500 cycles per second when the resistor 56 was such that the direct operating current was 9 milliamperes, whereas when the resistor 56 was adjusted so that the operating current was 13 milliamperes the frequency of oscillation was 2,000 cycles per second.

Figure 23:
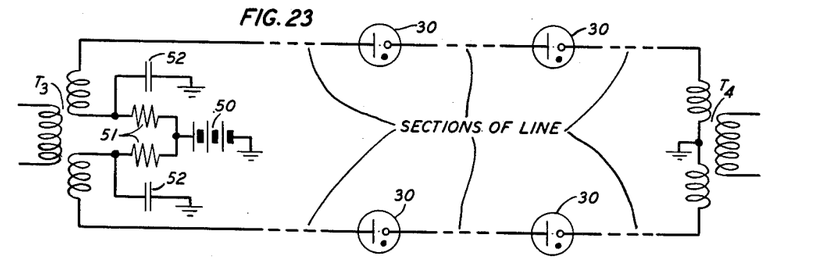
Fig. 23 is a diagram illustrating one application of devices constructed in accordance with this invention to transmission line loading.

Another application of devices constructed in accordance with this invention is illustrated in Fig. 23 and involves utilization of both the inductive and resistive components of the devices. Specifically, devices 30 are connected serially in each of a pair of transmission lines extending between transformers $T_3$ and $T_4$. The inductance of the devices is utilized to compensate for the shunting effect of the capacitance between the two line conductors. The negative resistance of the devices compensates for losses due to the line conductor resistance. The transformers $T_3$ and $T_4$ isolate the ends of the transmission line from the direct operating current for the glow discharge devices provided by the direct-current source 50.

Figure 24:
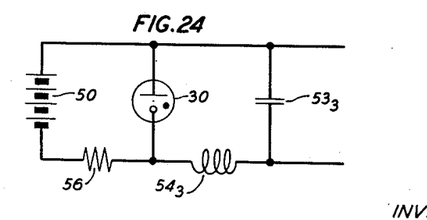
Fig. 24 is a schematic showing one application of devices constructed in accordance with this invention to filter networks.

Fig. 24 illustrates a filter section including devices constructed in accordance with this invention. The inductance $54_3$ is resonated with the capacitor $53_3$ at a prescribed frequency. For example if the inductor is 4.4 henries and the condenser $53_3$ has a capacitance of 0.222 microfarad the combination resonates at approximately 500 cycles per second. The circuit with the glow discharge device 30 omitted would have a Q of about 86. However, with the device 30 connected as shown, the device having negative resistance of 150 ohms, the Q of the circuit is increased by a factor of greater than 8 to approximately 740.

Although several specific embodiments of this invention have been shown and described, it will be understood that they are but illustrative and that various modifications may be made therein without departing from the spirit and scope of this invention.

What is claimed is:

1. A glow discharge device comprising an enclosing vessel having a gas filling, a cathode and an anode within said vessel, said cathode having juxtaposed faces bounding a cathode gap, said anode being positioned adjacent said juxtaposed surfaces and in immediate proximity to said cathode gap and defining an anode gap therewith, and said cathode gap, said anode gap and the pressure of said gas filling being mutually related so that over a range of operating currents in the abnormal operating range the resistive component of the cathode-anode impedance is negative.

2. A glow discharge device in accordance with claim 1 comprising source means connected between said cathode and anode for applying therebetween a potential above the minimum sustaining voltage, and resistance means in circuit with said source means and anode gap for fixing the direct operating current at the value for which said resistive component is of maximum amplitude.

3. A glow discharge device comprising an enclosing vessel having a filling of neon at a pressure of about 60 millimeters of mercury, a cathode having juxtaposed faces bounding a cathode gap of about 0.023-inch, and an anode positioned adjacent said juxtaposed faces and adjacent said cathode gap and defining an anode gap therewith of less than about 0.055-inch, whereby over a range of operating currents in the abnormal glow discharge the resistive component of the cathode-anode impedance is negative.

4. A glow discharge device in accordance with claim 1 wherein said gas filling is of argon at a pressure of about 20 millimeters of mercury, said cathode gap is about .020 to .030-inch and said anode gap is about 0.010-inch.

5. A glow discharge device comprising an enclosing vessel having a gas filling, a cathode and an anode within said vessel, said cathode having therein a substantially U-shaped channel the width of which is less than the length and depth thereof, said anode being in proximity to and extending substantially parallel to the open side of said channel, the width of said channel, the anode to cathode spacing and the pressure of said gas filling being such that for a range of operating currents above the current corresponding to the minimum sustaining voltage for the device and within the abnormal glow discharge, the resistive component of the cathode-anode impedance is negative.

6. A glow discharge device comprising an enclosing vessel having a filling of neon at a pressure of between about 30 and 120 millimeters of mercury, a cathode having therein a substantially U-shaped channel of a width between about 0.010-inch and 0.045-inch, said width being less than the length and depth of said channel, and an anode in proximity to and extending substantially parallel to the open side of said channel, the anode to cathode spacing being less than about 0.240-inch, whereby, for a range of operating currents above the current corresponding to the minimum sustaining voltage for the device and within the abnormal glow discharge, the resistive component of the cathode-anode impedance is negative.

7. A glow discharge device comprising an enclosing vessel having a gas filling, a cathode and an anode within said vessel, said cathode having therein a V-shaped channel the maximum width of which is less than the length and depth therof, said anode being opposite the open side of said channel, said width, the anode to cathode spacing and the pressure of said gas filling being such that adjacent the lower end of the abnormal operating range the slope of the current-voltage characteristic of the device is negative.

8. A glow discharge device in accordance with claim 7 wherein said gas filling is of neon and said anode is opposite the open side of said channel and substantially parallel thereto.

9. A glow discharge device in accordance with claim 7 wherein said gas filling is of argon and said anode is opposite one end of said channel.

10. A glow discharge device comprising an enclosing vessel having a filling of neon at a pressure between about 30 and 120 millimeters of mercury, a cathode having a pair of juxtaposed surfaces defining a cathode gap of less than about 0.045-inch, and anode positioned adjacent said juxtaposed surfaces and in proximity to said cathode gap and defining an anode gap therewith of less than about 0.240-inch, and source means for establishing between said anode and cathode a biasing potential of magnitude in the range above the normal glow discharge and within the abnormal glow discharge, whereby in said abnormal glow discharge at said potential the resistive component of the cathode-anode impedance is negative.

11. A glow discharge device in accordance with claim 1 wherein said juxtaposed cathode faces are defined by parallel plates.

12. A glow discharge device in accordance with claim 1 wherein said cathode is of flattened cylindrical form and hollow and said anode is opposite one end of said cathode.

13. A glow discharge device in accordance with claim 12 wherein said cathode is a helix of refractory metal wire, adjacent turns of the helix being in contact with one another.

14. A glow discharge device in accordance with claim 1 wherein said cathode has an aperture extending therethrough, which aperture has a portion of increased diameter intermediate its ends, and wherein said anode extends through said aperture.

15. A glow discharge device comprising an enclosing vessel having a filling of neon therein at a pressure between about 30 and about 100 millimeters of mercury, a cathode within said vessel having a pair of juxtaposed faces spaced between about 0.010 and about 0.045-inch apart, and an anode directly opposite and positioned from the space between said juxtaposed faces less than about 0.240-inch, said gas pressure and spacing between said cathode faces being such that said device has a decreasing voltage characteristic over a range of operating currents in the abnormal glow discharge.

16. A glow discharge device comprising an enclosing vessel having therein a gas filling, an anode, and a cathode within said vessel, said cathode having a pair of juxtaposed surfaces defining a cathode gap of width equal to $K$ times 0.023-inch, the depth and length of said cathode gap being greater than said width, said anode being mounted adjacent said juxtaposed surfaces and opposite said gap and spaced therefrom a distance less than the anode limit, and the pressure of said gas filling being $58/K$ millimeters of mercury and being between 35 and 120 millimeters of mercury, K being a constant.

17. A glow discharge device comprising an enclosing vessel having a gas filling, a cathode within said vessel and having juxtaposed surfaces defining a hollow cathode serving as the source for electrons from the cathode and having at least one side open to and communicating with said gas filling, and an anode in said vessel positioned in immediate proximity to the open side of said cathode and spaced therefrom, the dimensions of said cathode, the spacing of said anode from the open side of said cathode, and the pressure of said gas filling being mutually related so that over a range of operating currents in the abnormal operating range the resistive component of the cathode-anode impedance is negative.

18. A glow discharge device comprising an enclosing vessel having a gas filling, a cathode within said vessel and having an emitting region formed by closely juxtaposed surfaces substantially enclosing said region, and an anode in immediate proximity to said region and spaced therefrom, the dimensions of said cathode, the spacing of said anode from said enclosed region, and the pressure of said gas filling being mutually related to each other so that over a range of operating currents in the abnormal operating range the resistive component of the cathode-anode impedance is negative.

References Cited in the file of this patent
UNITED STATES PATENTS

| | | |
|---|---|---|
| 1,806,746 | De Forest | May 26, 1931 |
| 1,834,251 | Moore | Dec. 1, 1931 |
| 1,999,653 | Case | Apr. 30, 1935 |
| 2,020,723 | Foulke | Nov. 12, 1935 |
| 2,055,753 | Schnitzeler | Sept. 29, 1936 |
| 2,103,073 | Gaidies | Dec. 21, 1937 |
| 2,340,799 | Depp | Feb. 1, 1944 |
| 2,402,019 | Carpenter | June 11, 1946 |